United States Patent
Pearson et al.

(10) Patent No.: US 8,077,699 B2
(45) Date of Patent: Dec. 13, 2011

(54) INDEPENDENT MESSAGE STORES AND MESSAGE TRANSPORT AGENTS

(75) Inventors: Malcolm Erik Pearson, Kirkland, WA (US); Bruce A. McMillan, Sammamish, WA (US); Leon R. Warman, Kirkland, WA (US); Loren T. Curtis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 11/268,088

(22) Filed: Nov. 7, 2005

(65) Prior Publication Data

US 2007/0106783 A1  May 10, 2007

(51) Int. Cl.
| | |
|---|---|
| H04L 12/28 | (2006.01) |
| G06F 15/16 | (2006.01) |
| G01R 31/08 | (2006.01) |
| G06F 11/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................................. 370/351; 709/204
(58) Field of Classification Search ............... 709/206
See application file for complete search history.

(56) References Cited

U.S. PATENT DOCUMENTS

| | | | |
|---|---|---|---|
| 4,402,046 A | 8/1983 | Cox et al. | |
| 5,872,930 A * | 2/1999 | Masters et al. | 709/223 |
| 5,941,946 A * | 8/1999 | Baldwin et al. | 709/206 |
| 6,119,143 A * | 9/2000 | Dias et al. | 709/201 |
| 6,138,159 A | 10/2000 | Phaal | |
| 6,249,807 B1 | 6/2001 | Shaw et al. | |
| 6,336,135 B1 | 1/2002 | Niblett et al. | |
| 6,442,546 B1 | 8/2002 | Biliris et al. | |
| 6,487,586 B2 | 11/2002 | Ogilvie et al. | |
| 6,658,454 B1 * | 12/2003 | Delany et al. | 709/202 |
| 6,678,828 B1 | 1/2004 | Zhang et al. | |
| 6,704,772 B1 * | 3/2004 | Ahmed et al. | 709/207 |
| 6,718,367 B1 | 4/2004 | Ayyadurai | |
| 6,877,107 B2 | 4/2005 | Giotta et al. | |
| 6,910,154 B1 | 6/2005 | Schoenthal | |
| 7,155,483 B1 | 12/2006 | Friend et al. | |
| 7,155,723 B2 | 12/2006 | Swildens et al. | |

(Continued)

FOREIGN PATENT DOCUMENTS

JP  2001-326691 A  11/2001

(Continued)

OTHER PUBLICATIONS

Sun Microsystems, "Chapter 5 Deployment Design" [Online], Feb. 2005 [Retrieved Jul. 2009], <http://web.archive.org/web/20050219003745/http://docs.sun.com/source/819-0058/dep_architect.html>, pp. 1-22.*

(Continued)

*Primary Examiner* — Daniel J Ryman
*Assistant Examiner* — Christopher Crutchfield
(74) *Attorney, Agent, or Firm* — Senniger Powers LLP

(57) ABSTRACT

Multiple independent MTAs transmit messages such that if one of the MTAs fails, the other MTAs may continue to transmit messages. Multiple independent message stores are provided such that if one of the message stores fails, messages on the other message stores may continue to be transmitted. Multiple notification agents monitor the message stores for new messages and notify one of the MTAs when a new message is available for transmission.

12 Claims, 2 Drawing Sheets

U.S. PATENT DOCUMENTS

| | | | |
|---|---|---|---|
| 7,181,017 B1 | 2/2007 | Nagel et al. | |
| 7,395,314 B2* | 7/2008 | Smith et al. | 709/206 |
| 7,466,694 B2 | 12/2008 | Xu et al. | |
| 7,590,736 B2 | 9/2009 | Hydrie et al. | |
| 7,620,630 B2* | 11/2009 | Lloyd et al. | 1/1 |
| 2001/0032245 A1* | 10/2001 | Fodor | 709/206 |
| 2002/0162047 A1 | 10/2002 | Peters et al. | |
| 2003/0028580 A1* | 2/2003 | Kucherawy | 709/101 |
| 2003/0059030 A1 | 3/2003 | Tenorio | |
| 2003/0154254 A1 | 8/2003 | Awasthi | |
| 2003/0167316 A1 | 9/2003 | Bramnick et al. | |
| 2003/0177194 A1 | 9/2003 | Crocker et al. | |
| 2004/0059789 A1 | 3/2004 | Shum | |
| 2004/0087311 A1 | 5/2004 | Haglund | |
| 2004/0153473 A1 | 8/2004 | Hutchinson et al. | |
| 2004/0162880 A1* | 8/2004 | Arnone et al. | 709/206 |
| 2004/0167965 A1 | 8/2004 | Addante et al. | |
| 2004/0243699 A1 | 12/2004 | Koclanes et al. | |
| 2004/0260778 A1 | 12/2004 | Banister et al. | |
| 2005/0044151 A1 | 2/2005 | Jiang et al. | |
| 2005/0091323 A1* | 4/2005 | Smith et al. | 709/206 |
| 2005/0131719 A1 | 6/2005 | Bresnan et al. | |
| 2005/0132069 A1 | 6/2005 | Shannon et al. | |
| 2005/0149479 A1 | 7/2005 | Richardson et al. | |
| 2005/0182960 A1 | 8/2005 | Petry et al. | |
| 2005/0228867 A1 | 10/2005 | Osborne et al. | |
| 2005/0256931 A1 | 11/2005 | Follmeg et al. | |
| 2005/0262205 A1 | 11/2005 | Nikolov et al. | |
| 2005/0283658 A1 | 12/2005 | Clark et al. | |
| 2006/0053262 A1 | 3/2006 | Prahlad et al. | |
| 2006/0053263 A1 | 3/2006 | Prahlad et al. | |
| 2006/0095569 A1 | 5/2006 | O'Sullivan | |
| 2006/0106938 A1 | 5/2006 | Dini et al. | |
| 2006/0168046 A1 | 7/2006 | Qureshi | |
| 2006/0182034 A1 | 8/2006 | Klinker et al. | |
| 2006/0253597 A1 | 11/2006 | Mujica | |
| 2007/0055789 A1 | 3/2007 | Claise et al. | |
| 2007/0088822 A1 | 4/2007 | Coile et al. | |
| 2007/0177731 A1 | 8/2007 | Spies et al. | |
| 2007/0206762 A1 | 9/2007 | Chandra et al. | |
| 2008/0060080 A1 | 3/2008 | Lim | |
| 2008/0137580 A1 | 6/2008 | Axelsson et al. | |
| 2010/0121932 A1 | 5/2010 | Joshi et al. | |

FOREIGN PATENT DOCUMENTS

| | | |
|---|---|---|
| JP | 2004248177 A1 | 9/2004 |
| KR | 1020010092554 A | 10/2001 |
| KR | 1020040079667 A | 9/2004 |
| KR | 1020040091656 A | 10/2004 |
| WO | WO 00/72534 A1 | 11/2000 |
| WO | 0127772 A1 | 4/2001 |
| WO | WO 2004/042570 A2 | 5/2004 |
| WO | WO 2005/072425 A2 | 8/2005 |

OTHER PUBLICATIONS

Koetke et al, "Installing and Configuring the Exchange 2003 Management Pack," Microsoft Exchange Server Series, May 2003, 49 pages, Microsoft Corporation, U.S.A.

Unknown, "MailSite LE," printed from http://www.rockliffe.com/products/mailsitele/mailsite-le-windows-email-server.asp, printed on Jan. 12, 2006, 3 pages, Rockliffe, Inc., U.S.A.

Unknown, Kansas State University E-Mail Enhancement Project Design Document, 76 pages, 2004, Kansas State University, U.S.A.

Unknown, "Sun Java System Messaging Server Release Notes," Version 6 2004Q2, 2004, 57 pages, Sun Microsystems, Inc. U.S.A.

Red Hat Linux Version 7, "Red Hat Linux Version 7 Unleashed", by Bill Blass; Copyright Oct. 30, 2000, 19 pages.

* cited by examiner

INDEPENDENT MESSAGE STORES AND MESSAGE TRANSPORT AGENTS

BACKGROUND

Businesses and individuals rely heavily on e-mail systems to communicate. Because of the critical nature of these communications, it is essential that e-mail systems are both reliable and efficient. Current methods known in the art typically co-locate a message transport agent (MTA) and a message store within a single integrated system in order to manage delivery to users and for message transmission. This method may result in two single points of failure.

First, the message store may be a single point of failure. The message store contains all messages in the system. If the message store fails, the MTA cannot access the message store. A system failure will result because the MTA cannot deliver new incoming messages to the message store and no outgoing messages on the message store can be transmitted by MTA.

Second, the MTA may be a single point of failure. The MTA is responsible for delivering and transmitting messages to the message store. If the MTA fails, a system failure will result because no new incoming messages can be delivered to the message store and no new outgoing message may be transmitted from the message store.

SUMMARY

In one embodiment, a method is provided for notifying a MTA that a new message is available for transmission on a message store. When the new message has been received on the message store, an MTA is selected and notified. The MTA responds to the notice by transmitting the new message to a specified destination.

In another embodiment, the clustered mail box and notification agent includes multiple notification agents and multiple MTAs. The notification agents can access all MTAs. Each notification agent is associated with a message store. The notification agent monitors the message store for new messages. Each MTA can access all message stores.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
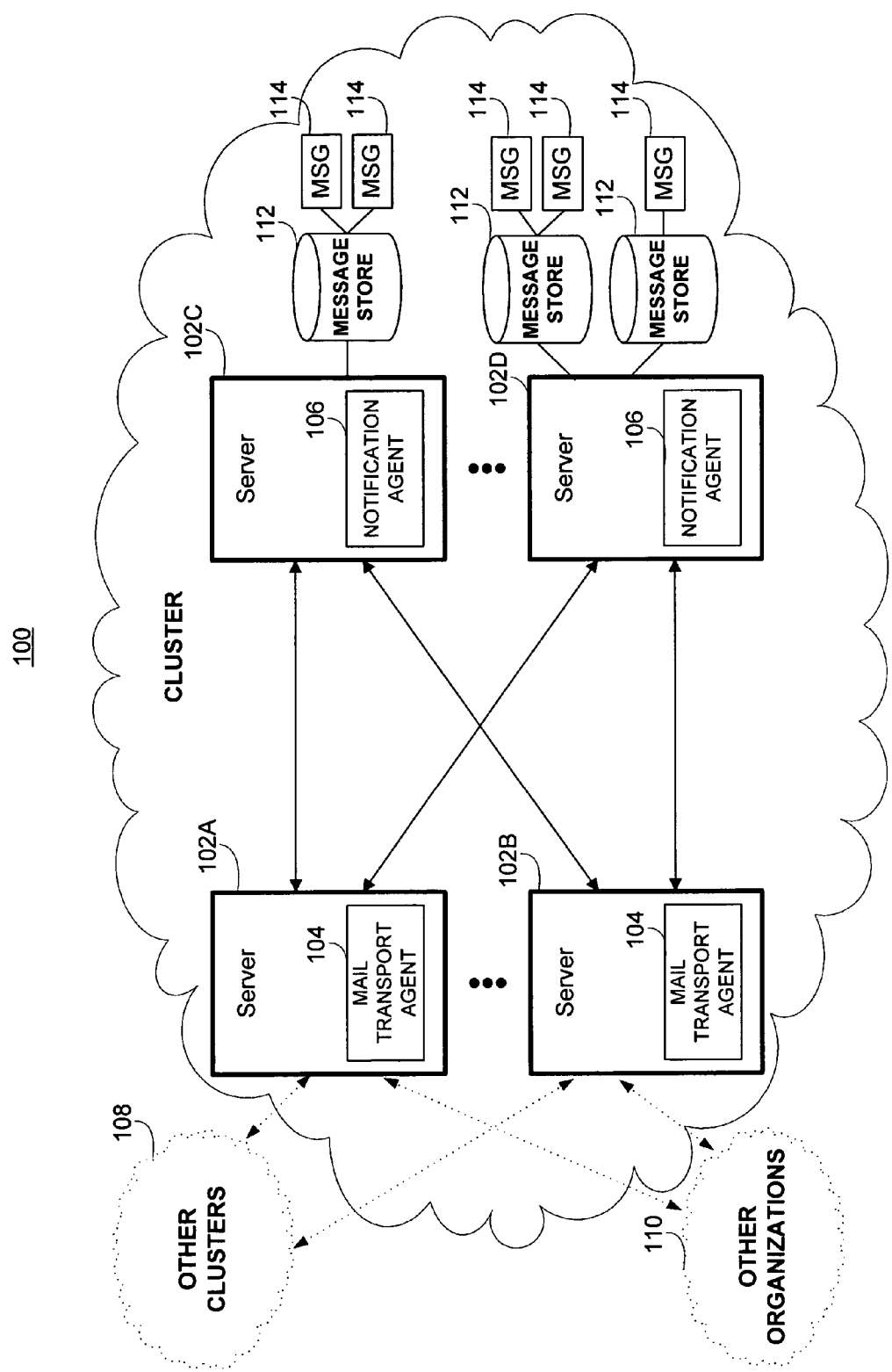
FIG. 1 is a block diagram illustrating on exemplary embodiment of a suitable computing system of the invention.

FIG. 1 is a block diagram illustrating on exemplary embodiment of a suitable computing system of the present invention. A cluster 100 contains multiple independent servers 102 that operate together to provide a unified message system. Multiple servers 102 within the cluster will execute a message transport agent (MTA) 104 or a notification agent 106. The MTAs (104) are responsible for delivering incoming messages and transmitting outgoing messages 114. After receiving a message 114, the MTA 104 may forward it to other clusters 108 and other organizations 110. Additionally, the MTA 104 may deliver the message to a message store 112 within the cluster.

The notification agents 106 are responsible for notifying one of the MTAs 104 that a new outgoing message 114 is available on the message store 112. The message stores 112 contain all messages (incoming and outgoing 114) within the cluster 100. At least one message store 112 is associated with each server 102C, 102D executing the notification agent 106. Outgoing messages 114 are stored on the message store 112 awaiting transmission by the MTA 104.

Each notification agent 106 may access all MTAs 104 and each MTA 104 may access all messages stores 112, via the servers 102C, 102D. If a message store is inaccessible and a remaining message store is accessible, the received messages on the remaining accessible message store may be transmitted, thus minimizing the impact of the inaccessible message store as a single point of failure. And, if the selected MTA is inaccessible and a remaining MTA is accessible, the received message may be transmitted by the remaining accessible MTA, thus eliminating the selected MTA as a single point of failure.

By executing the MTAs 104 and the notification agents 106 on separate servers 102A, 102B, 102C, 102D and allowing full-mesh connectivity between MTAs 104, notification agents 106, and message stores 112, one of the single points of failure is removed: the single MTA. The message store 112 will still remain a single point of failure, but there are now less moving parts on that machine so that the probability of failure is further reduced. Additionally, if multiple servers 102C, 102D house the message stores 112 and a single message store fails, the MTA 104 may continue to transmit the messages 114 from the other message stores. This will minimize the impact of the failure on the system.

Furthermore, enabling multiple MTAs 104 to share in message transmission allows the work load to be shared across multiple servers 102A, 102B running the MTAs 104. This load balancing provides a more efficient use of hardware resources. Also, multiple MTAs 104 allow a network operator to take one MTA server offline without halting the flow of messages. Thus, hardware or software upgrades can be done to the server without any impact to the functionality of the system.

In one embodiment, the notification agent 106 runs inside of service on the server 102C, 102D. Because the notification agent 106 and the MTA 104 are located on separate servers, the notification agent 106 utilizes a remote procedure call to communicate with the MTA 104. Additional means of communication may be employed, including UDP ping and TCP connections. In another embodiment, the notification agent 106 tracks performance counters including: remote calls per second, remote calls, and the number of inaccessible servers. To alert system administrators of a possible system failure, in another embodiment, the notification agent 106 creates entries in a system log when no MTA 104 is available to process a message transmission.

In operation, the notification agent 106 monitors the message store 112 for new outgoing messages 114. When a new outgoing message 114 is detected by the notification agent 106, the notification agent 106 selects and notifies one of the MTAs 104 that the message is available for transmission. The MTA 104 responds to the notification by transmitting the message to other clusters 108, other organizations 110, or to one of the message stores 112 in the cluster 100.

The server 102 typically has at least some form of computer readable media. Computer readable media, which include both volatile and nonvolatile media, removable and non-removable media, may be any available medium that may be accessed by server 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by server 102. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The server 102 typically has some form of system memory including computer storage media in the form of removable and/or non-removable, volatile and/or nonvolatile memory. In the illustrated embodiment, system memory includes read only memory (ROM) and random access memory (RAM).

The server 102 may operate in a networked environment using logical connections to one or more remote computers, such as a remote computer. The remote computer may be a personal computer, a server, a router, a network PC, a peer device or other common network node, and typically includes many or all of the elements described above relative to server 102. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

When used in a local area networking environment, server 102 is connected to the LAN through a network interface or adapter. When used in a wide area networking environment, server 102 typically includes a modem or other means for establishing communications over the WAN, such as the Internet. The modem, which may be internal or external, is connected to system bus via the user input interface, or other appropriate mechanism. In a networked environment, program modules depicted relative to server 102, or portions thereof, may be stored in a remote memory storage device (not shown). By way of example, and not limitation, FIG. 1 illustrates remote application programs as residing on the memory device. The network connections shown are exemplary and other means of establishing a communications link between the computers may be used.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, server 102 executes computer-executable instructions such as those illustrated in the figures to implement aspects of the invention.

Figure 2:
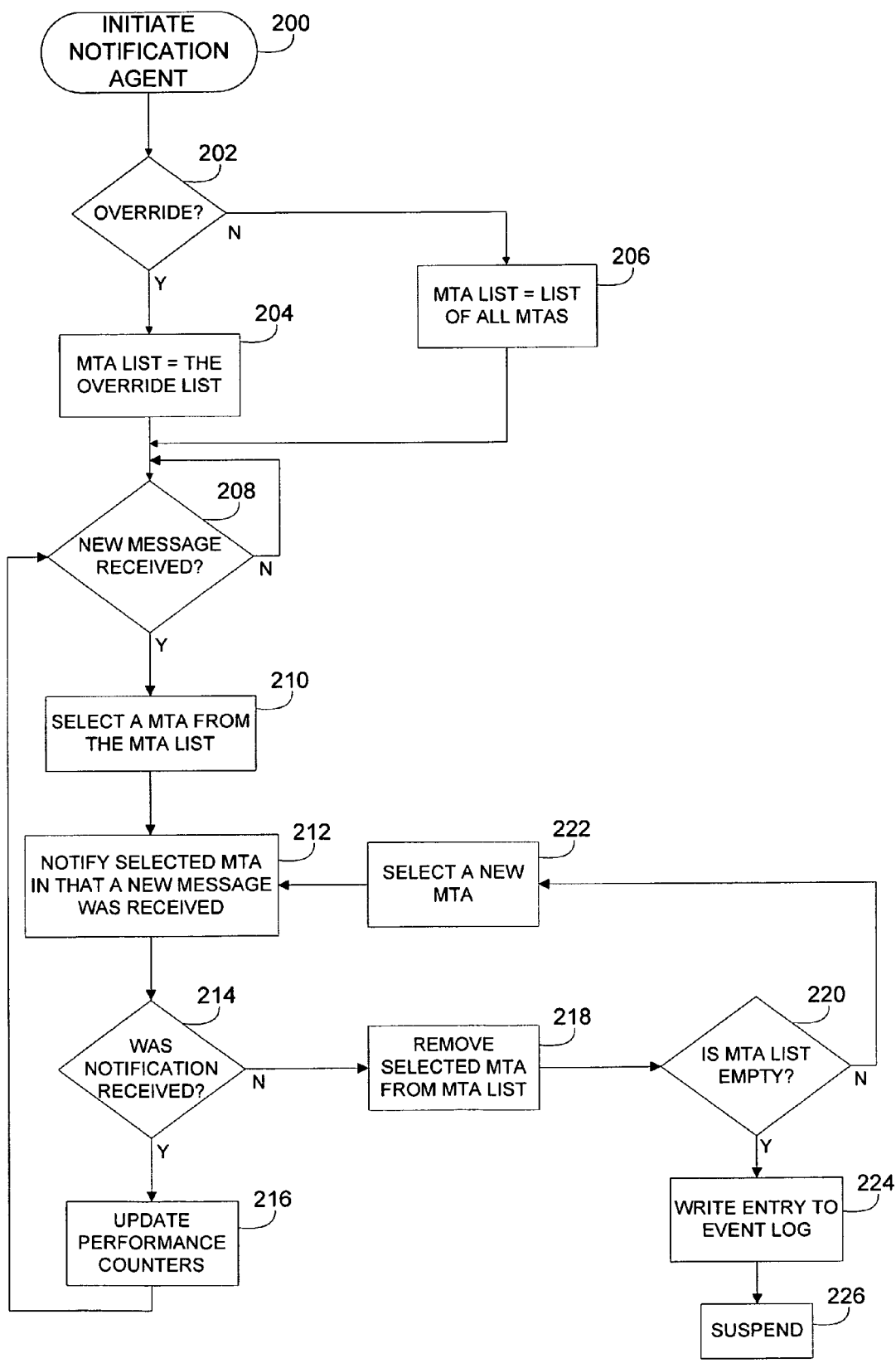
FIG. 2 is an exemplary flowchart of one embodiment of a method of MTA notification.

FIG. 2 is an exemplary flowchart of one embodiment of implementing MTA notification. At 200, a notification agent responsible for notifying a MTA when there are new messages that need to be transmitted is initiated. At 202, the notification agent determines if an override list of MTA exists. If so, the override list is obtained at 204, from a server. One purpose of the override list is to allow an administrator to be able to tie a message store to a single or small group of MTAs. For example, if an administrator is trying to track down a transient problem that may be related to one of the MTAs in the cluster, a message store can be tied to each MTA in the site until the server that is having the problem is discovered. In another example, if an administrator wants to ensure that more submission requests go to a more robust MTA, one or more message stores can be restricted to use the robust MTA exclusively.

The override list is a list of servers executing the MTA that is maintained on the server executing the notification agent. By default, no override list will exist. If the override list is present, the notification agent will only notify MTAs in the list. For example, the override list may be located on a server object in a "ACTIVE DIRECTORY" brand directory service of Microsoft Corporation, Redmond, Wash. The override list will be stored in the SubmissionServerOverrideList property that will exist in the server object. The set-mailboxserver and get-mailbox server tasks may be used to update the override list. The following is an algorithm that retrieves the current override list from the server object, clears the list, and adds a new entry to the list:

```
$overrideList =
    (get-mailboxserver).SubmissionServerOverrideList
$overrideList.Add("<ADObjectId of a MTA server>")
    set-mailboxserver -Identity:<ID of the mailbox server> -
    SubmissionServerOverrideList
$overrideList
```

The following is an algorithm that removes the override list once it has been created:

```
$overrideList = (get-mailboxserver).SubmissionServerOverrideList
$overrideList.Clear( )
    set-mailboxserer -Identity:<ID of the mailbox server> -
    SubmissionServerOverrideList
$overrideList
```

At 202, if it is determined that the override list of MTA does not exist, a list of available MTAs is obtained at 206. In one embodiment, the list is obtained by querying the directory service for the list of all MTAs in the cluster. At 208, the notification agent monitors the message store for new messages. When a new message is detected, the notification agent selects an MTA from the list at 210. In one embodiment, the MTA is selected to balance the load across the MTAs so that each MTA will get substantially equal distribution of notifications. For example, the following round-robin algorithm may be used to implement the load balancing where the CurrentMTA represents the selected MTA, MTAArray represents the list of MTAs, and NumMTAs represents the number of MTAs in the MTA list:

CurrentMTA++=MTAArray[CurrentMTA % NumMTAs]

In another embodiment, the MTA is selected as a function of the load capacity of each of the MTAs and the current load of each of the MTAs. In another alternative embodiment, a list of monitored message stores is obtained and the MTA is selected as a function of the list of message stores and the list of MTAs. In another embodiment, the selection prefers the same MTA to increase system determinism. For example, the list of message stores and MTAs are sorted; the index of the message store containing the new message is determined; and the MTA is selected by indexing into the MTA list using the index determined in the preceding step, allowing the index to wrap.

At 212, a notification is sent to the selected MTA. In one embodiment, the notification agent utilizes a RPC to send the notification. In another embodiment, the notification provides the following data as parameters associated with the new message: entry ID for the item being submitted, parent entry ID for the message, message class for the message, the mailbox that contains the message. In this embodiment, all parameters are retrieved off a MapiEvent structure on the server.

At 214, the notification agent determines whether the notification was received by the MTA. In one embodiment, a return value is implemented to make the determination. The return value will contain one of the following possible values (although other values are contemplated): notification successful, notification failed due to a transient message error, or notification failed due to a non message error. For example, if notification failed due to a transient message error, the notification will be retried at later time because this is an indication that the MTA was accessible by the notification agent but unable to transmit the message temporarily. If the notification failed due to a non message error, the notification will be retried utilizing another MTA because this is an indication that the MTA was no longer accessible to the notification agent.

If a determination is made at 214 that the notification was successful, performance counters are updated at 216. Then, the notification agent continues to monitor the message store for new messages at 208.

If a determination is made at 214 that the notification unsuccessful, the selected MTA is removed from the MTA list at 218. In one embodiment, the removed MTA will be added back to the list of MTAs after 600 seconds. If it is determined that the MTA list is not empty at 220, a new MTA is selected at 222. In one embodiment, the next MTA in the list is selected as the new MTA. Once the new MTA is selected at 222, the new MTA will be notified that the message is available for transmission at 212.

If the MTA list is determined to be empty at 220, an event log entry is written at 224 to alert system administrators that there are no MTAs available to transmit the new message. At 226, the notification agent will temporarily suspend notifications.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:
1. A computerized method of a notification agent, said method comprising:
monitoring a message store of a cluster of servers for new messages, said cluster including a plurality of notification servers and a plurality of transport servers, wherein each server is independent of the other servers, wherein the monitored message store does not broadcast receipt of new messages;

obtaining a list of a plurality of message transport agents (MTA), wherein each MTA has direct access to the monitored message store;

selecting one of the plurality of MTAs for notification when a new message is directly received by the monitored message store and wherein the notification agent is otherwise unaware of the new message;

notifying the selected MTA that the received new message in a monitored message store is available for transmission without transmitting the received new message to the selected MTA, so that the selected MTA responds to the notification by retrieving the received new message directly from the monitored message store specified by the notification agent and transmitting the received new message to a specified destination;

executing the notification agent on one of the notification servers, wherein each notification server executes only one notification agent; and executing each of the plurality of MTAs on one of the transport servers wherein each transport server executes only one of the MTAs, said selecting includes indexing an MTA Array as a function of an index number of the monitored message store that receives the new message in a sorted list of the plurality of message stores.

2. The method of claim 1, wherein the selecting of the MTA further comprises checking an override list containing a subset of the plurality of MTAs, and selecting the MTA from the override list.

3. The method of claim 1, wherein the notifying includes providing the following parameters associated with the received new message to the selected MTA: an entry identifier, a parent entry identifier, a message class, and a mailbox identifier.

4. The method of claim 1 further comprises:
receiving a return value from the selected MTA, wherein the return value indicates that the transmission of the received message by the selected MTA was successful.

5. The method of claim 1 further comprises:
receiving a return value from the selected MTA, wherein the return value indicates if the transmission of the received message by the selected MTA was unsuccessful;
modifying the list of MTAs by removing the selected MTA from the list of MTAs;
selecting a new MTA from the modified list of MTAs; and
notifying the new MTA that the received message is available for transmission, so that the new MTA responds to the notification by transmitting the received message to a specified destination.

6. The method of claim 1, wherein if one of the plurality of MTAs is inaccessible, the inaccessible MTA is removed from the list of MTAs.

7. The method of claim 6, wherein the removed inaccessible MTA is added back to the list of MTAs after a period of time.

8. The method of claim 1, wherein if the list of MTAs is empty, further comprising:
writing an event log entry, wherein the entry indicates that no MTA can be found to transmit the new received message.

9. The method of claim 1 further comprising:
tracking of performance counters, wherein said counters are related to the notifying of the selected MTA and include at least one of the following: remote calls per second, remote calls, and number of inaccessible MTAs.

10. One or more non-transitory computer-readable media having computer-executable instructions for performing the method of claim 1.

11. A system, comprising:
a cluster of servers including a plurality of notification servers and a plurality of transport servers wherein each server is independent of the other servers, said cluster including a plurality of message stores;

a plurality of notification agents, each associated with one of the plurality of message stores and each executed by one of the notification servers of the cluster wherein each notification server executes only one of the notification agents, wherein each notification agent monitors its associated message store for new messages, wherein the notification agent is otherwise unaware of the new messages; and a plurality of message transport agents (MTAs), each accessible by each of the notification agents and each executed by one of the transport servers of the cluster wherein each transport server executes only one of the MTAs, wherein each MTA can directly access each of the message stores, wherein the notification agent selects one of the plurality of MTAs for notification when a new message is directly received at a monitored message store, wherein the MTA is selected by the notification agent from the list of MTAs by indexing an MTA Array as a function of an index number of the monitored message store that receives the new message in a sorted list of the plurality of message stores, wherein said notification agent notifies the selected MTA that the received message is available for transmission in the monitored message store without transmitting the received new message to the selected MTA, and wherein the selected MTA responds to the notification by retrieving the received message directly from the monitored message store specified by the notification agent and transmitting the received message to a specified destination.

12. In a system wherein new messages are stored in a single message store for transmission by a single message transport agent (MTA), the improvement comprising:
a cluster of servers including a plurality of notification servers and a plurality of transport servers wherein each server is independent of the other servers, said cluster including all the message stores;

additional MTAs, wherein each MTA can access each message store and each is executed by one of the transport servers, wherein each transport server executes only one of the MTAs;

a plurality of notification agents, each associated with one or more of the plurality of message stores, wherein each notification agent monitors the associated message store for new messages, wherein the notification agent is otherwise unaware of the new messages, each notification agent executed by one of the notification servers, wherein each notification server executes only one of the notification agents;

wherein the notification agent maintains a sorted list of the plurality of MTAs and further maintains a sorted list of all associated message stores, wherein the notification agent selects one of the plurality of MTAs for notification when a new message is directly received at an associated message store by determining an index of the associated message store having the new message from the sorted list of all associated message stores and indexing into the sorted list of the plurality of MTAs using the determined index of the associated message store, and said notification agent notifies the selected MTA that the received message is available for transmission from the associated message store without transmitting the received message to the selected MTA;

wherein the selected MTA responds to the notification by retrieving the received new message directly from the monitored message store specified by the notification agent and transmitting the received message to a specified destination; and whereby if a message store is inaccessible and a remaining message store is accessible, the received messages on the remaining accessible message store may be transmitted, thus minimizing the impact of the inaccessible message store as a single point of failure; and if the selected MTA is inaccessible and a remaining MTA is accessible, the received message may be transmitted by the remaining accessible MTA, thus eliminating the selected MTA as a single point of failure.

* * * * *